B. Barker,
Circular Saw Mill,
№ 22,846.      Patented Feb. 8, 1859.
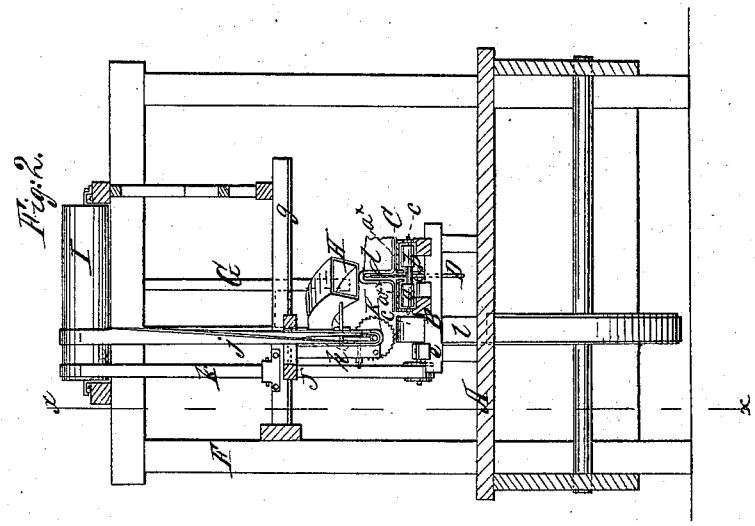
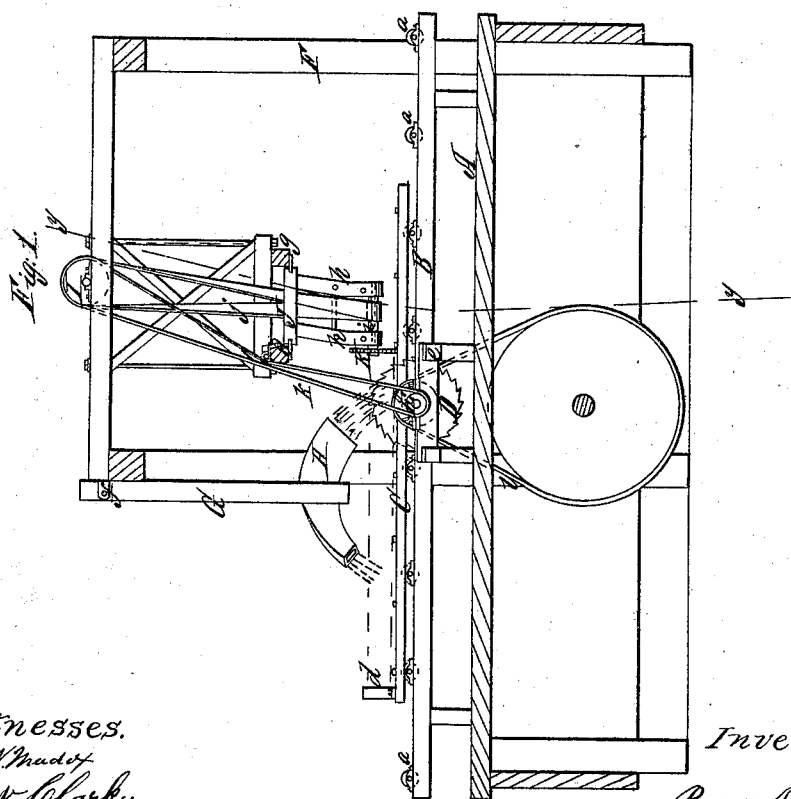
Witnesses.
Geo. W. Mader
A. W. Clark.
Inventor:
Benj. Barker

UNITED STATES PATENT OFFICE.

BENJAMIN BARKER, OF ELLSWORTH, MAINE.

SAWING-MACHINE.

Specification of Letters Patent No. 22,846, dated February 8, 1859.

*To all whom it may concern:*

Be it known that I, BENJAMIN BARKER, of Ellsworth, in the county of Hancock and State of Maine, have invented a new and Improved Sawing-Machine Designed for Edging, Slitting, and Trimming Lumber; and I do hereby declare that the following is a full, clear, and exact description of the same, reference being had to the annexed drawings, making a part of this specification, in which—

Figure 1, is a longitudinal vertical section of my invention, taken in the line $x$, $x$, Fig. 2. Fig. 2, is a transverse section of ditto, taken in the line $y$, $y$, Fig. 1.

Similar letters of reference indicate corresponding parts in the two figures.

The object of this invention is to enable the circular saw to cut the lumber while moving in either direction, so that the time hitherto expended in "gigging back" the lumber will be saved and the saw permitted to operate equally well at either side.

The invention also has for its object the trimming of the ends of the lumber so that the edging or slitting and trimming may be performed at one operation.

These ends are attained by the employment or use of a saw dust spout arranged relatively with the saw in such a manner as to receive the dust therefrom and carry it to the back side of the feed table; also by the employment or use of a trimming saw arranged to operate as hereinafter fully shown and described.

To enable those skilled in the art to fully understand and construct and use my invention I will proceed to describe it.

A, represents the flooring of a mill or building in which the machine is placed, and B, is an elevated frame work on which rollers $a$, are placed transversely, and on which rollers a feed table C, is placed and allowed to move freely back and forth. The rollers $a$, may be grooved circumferentially in order to receive a projecting ledge $b$, at the under side of the feed table as shown clearly in Fig. 2, and the edges of the feed table may also be provided with ledges $c$, $c$, to project down over the ends of the rollers and retain the feed table in proper position. This will be clearly understood by referring to Fig. 2. The feed table C, is formed of two longitudinal parts $a^x$, $a^{xx}$, connected by a yoke $d$, at one end.

D, is a circular saw which is fitted on a mandrel E, as usual. This mandrel is placed in a suitable frame $e$, and the saw D, is at the center of the frame work B, and works between the two parts $a^x$, $a^{xx}$, of the table as shown clearly in Fig. 2.

On the flooring A, a frame work F, is placed. This frame work extends some distance above the saw, and a pendent frame G, is attached thereto by a joint $f$. In the lower part of the frame G a curved spout H, is placed obliquely, the oblique position being shown clearly in Fig. 2. One end of this spout, the inner end or that which faces the saw, is of larger dimensions than the opposite end and the latter or small end projects over or beyond the edge or side of the feed table. The spout H, is a trifle above the saw D, and at one side as shown plainly in Fig. 1.

In the upper part of the frame work F, a drum I, is placed. This drum is parallel with the saw mandrel E, and in the frame work F, below the drum I, two parallel guide bars $g$, $g$, are attached between which a carriage J, is placed. This carriage J, has two hangers $h$, $h$, attached to it, in the lower parts of which a saw mandrel $i$ is placed, said mandrel having a circular saw K, at one end which saw is driven by a belt $j$, from the drum I, the latter being driven by a belt $k$, from the saw mandrel E. The guide bars $g$, $g$, extend transversely over the frame work B and consequently the mandrel of the saw K, is at right angles to the mandrel of the saw D. The saw D, is driven by a belt $l$, from mechanism below the flooring A.

The operation of the machine is as follows: In edging and trimming the attendants place the piece of lumber to be operated upon shown in red, on the part $a^x$, of the feed table C, the feed table being at the end of its movement at one side of the saw, and the attendants adjust the stick on the table in a proper relative position with the saw so that the latter will cut one edge of the piece of lumber. The feed table C, is then moved by hand, toward the saw D, the latter entering the lumber and when the end of the stick reaches a point opposite the saw K, the feed table C, is stopped and the carriage J, is drawn along by hand between the guides $g$, $g$, and the saw K, trims off the end of the piece of lumber at right angles with its sides. The saw K, is then allowed to return back, by a weight or other means, to its original position, and the table C, is again moved forward, the edging saw D, operating as usual, and when the feed table has passed to the opposite side of the saw and one side of the lumber edged, it is turned on the part $a^x$, of the table so that its opposite side will be adjusted to the edging saw D. The piece of lumber is then again moved toward the saw in the opposite direction and when its untrimmed end reaches a point in line with the saw K, the movement of the feed table C is stopped and the carriage J moved as before so that the saw K, will cut or trim off the other end of the piece of lumber. The feed table is then again moved, the arrow in Fig. 1, indicating the direction and the saw edges the opposite side of the piece of lumber. During this movement of the feed table, viz, in the direction of the arrow, the saw D, cuts in an upward direction and the spout H, receives the dust and conveys it to one side of the feed table so that it cannot drop thereon, but will fall on the floor at one side of it. This spout therefore by keeping the feed table free from dust permits the lumber to rest steady on the feed table so that it can be cut or edged while fed to the saw in either direction. This result could not otherwise be obtained. The edging cut from the lumber rests on the part $a^{xx}$, of the feed table. In slitting lumber the operation of course is substantially similar.

Having thus described my invention what I claim as new and desire to secure by Letters Patent, is—

1. The saw dust spout H, arranged relatively with the edging saw D, and feed table C, substantially as and for the purpose set forth.

2. The trimming saw K, when used in connection and arranged relatively with the edging saw D, to operate conjointly therewith as described.

BENJAMIN BARKER.

Witnesses:
GEO. W. MADOX,
A. W. CLARK.